United States Patent [19]

Peynaud

[11] 4,270,191
[45] May 26, 1981

[54] DOPPLER CURRENT METER FOR USE AT GREAT DEPTHS

[75] Inventor: Francois Peynaud, Paris, France

[73] Assignee: Thomson-CSF, Paris, France

[21] Appl. No.: 91,753

[22] Filed: Nov. 6, 1979

[30] Foreign Application Priority Data

Nov. 10, 1978 [FR] France .................. 78 31862

[51] Int. Cl.$^3$ ............................................. G01S 15/58
[52] U.S. Cl. ...................................... 367/91; 367/92; 73/170 A; 73/189
[58] Field of Search ................. 367/91, 92; 73/170 A, 73/189

[56] References Cited

U.S. PATENT DOCUMENTS 4,138,657  2/1979  Shave ....................................... 367/91

Primary Examiner—Richard A. Farley
Attorney, Agent, or Firm—Cushman, Darby & Cushman

[57] ABSTRACT

The invention relates to a device for measuring aquatic currents, placed on a moving boat comprising a Doppler effect sonar. The device comprises two sets of transducers and transmitting and receiving in the directions $D_1$, $D_2$, $D_3$ and $D_4$ forming an angle $\pm\alpha$ with the vertical z. A transmission circuit supplies impulses simultaneously at two frequencies $f_1$ and $f_2$. The receiving circuit processes the signals of the volume reverberation echos affected by the Doppler effect, corresponding to the frequencies $f_1$ and $f_2$, and the sea bed echo affected by the Doppler effect at the frequency $F=f_1-f_2$, this frequency being generated by the non-linearity of the medium. Finally are obtained the profile of the horizontal velocities of the currents function of the depth.

7 Claims, 7 Drawing Figures

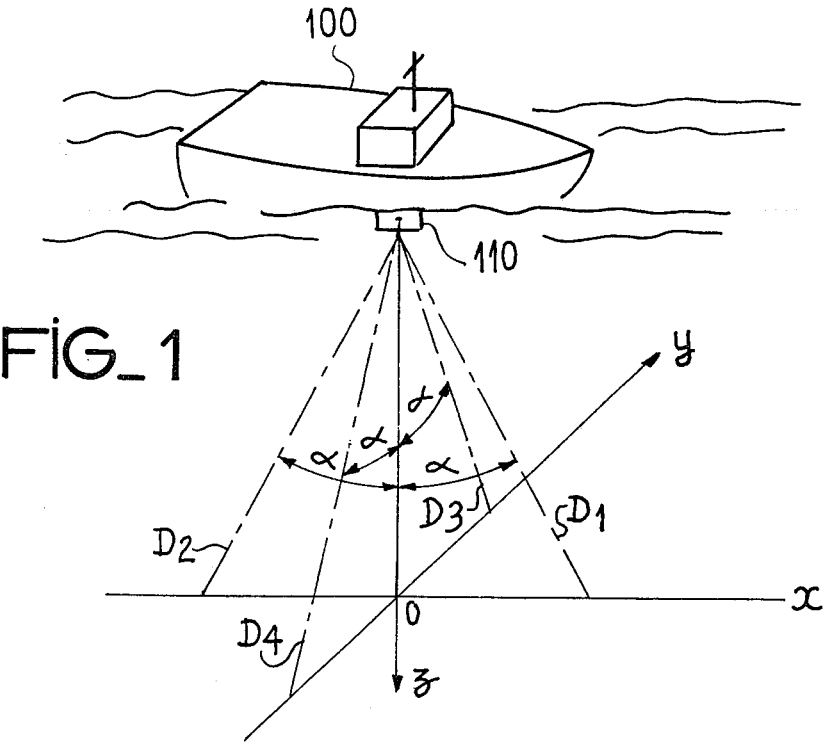
FIG_1
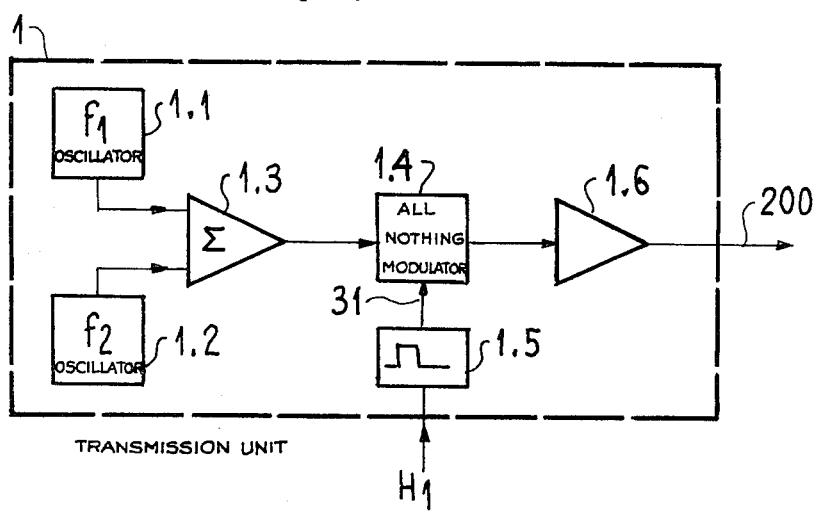
FIG_3

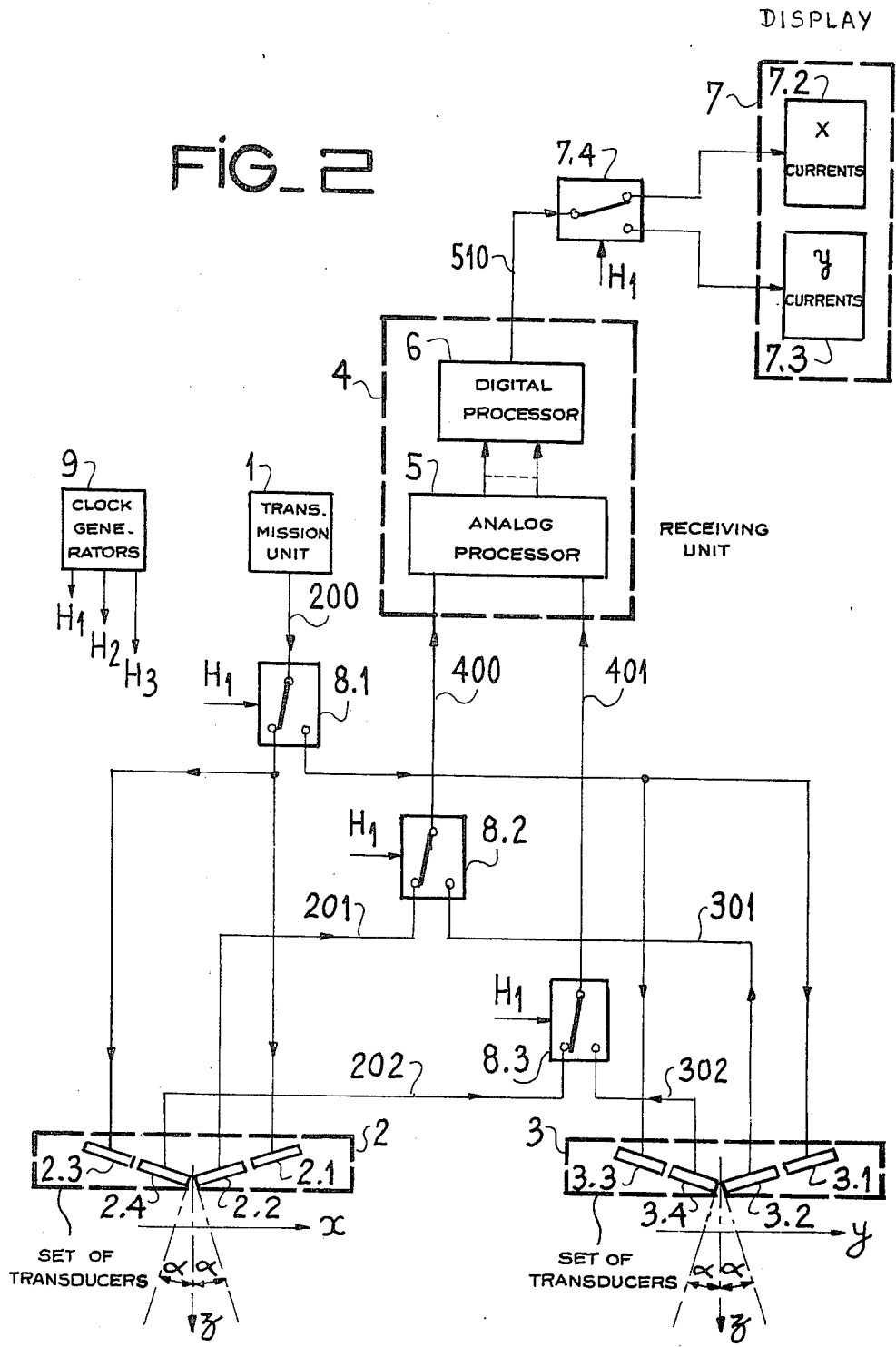

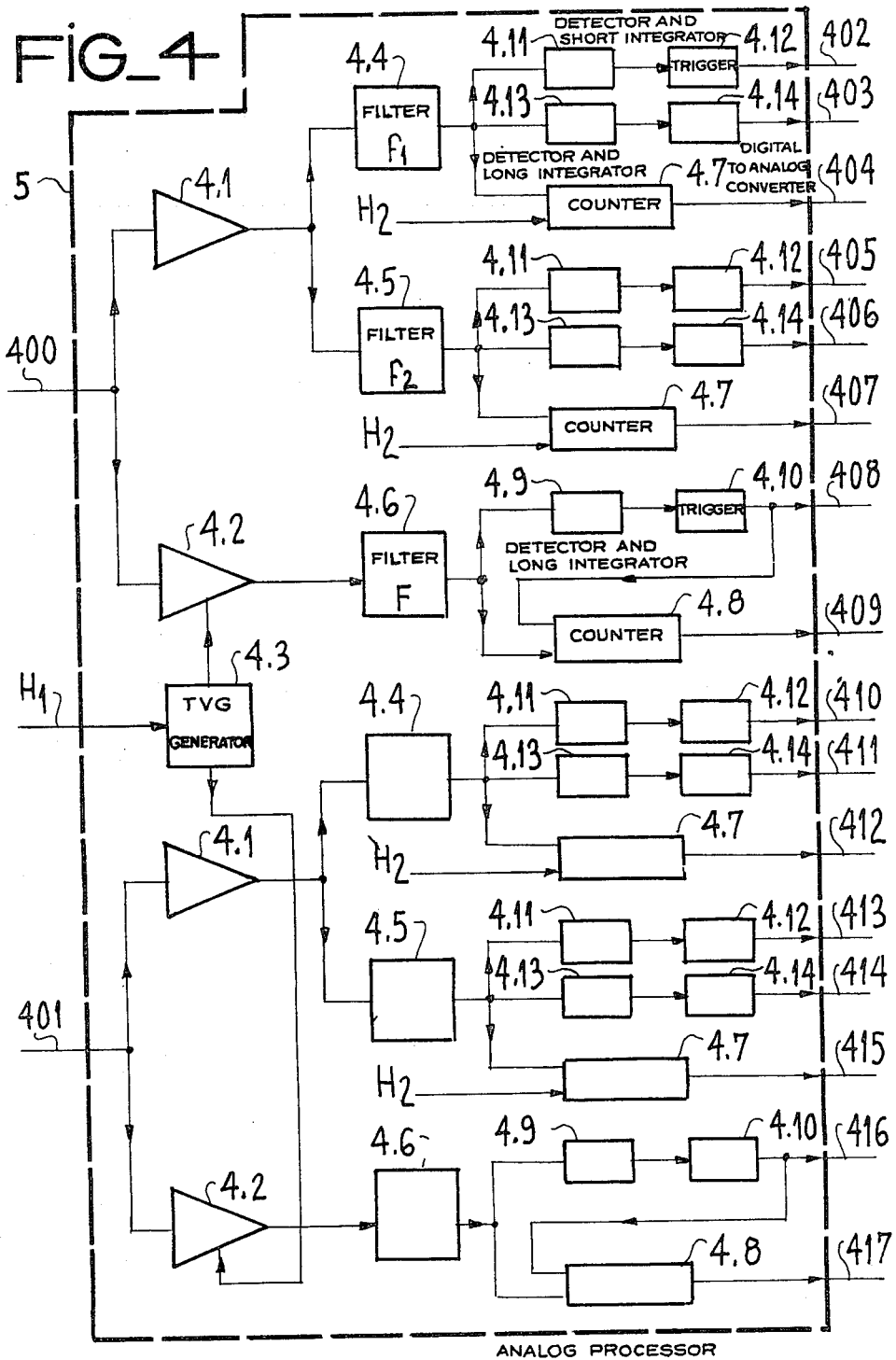

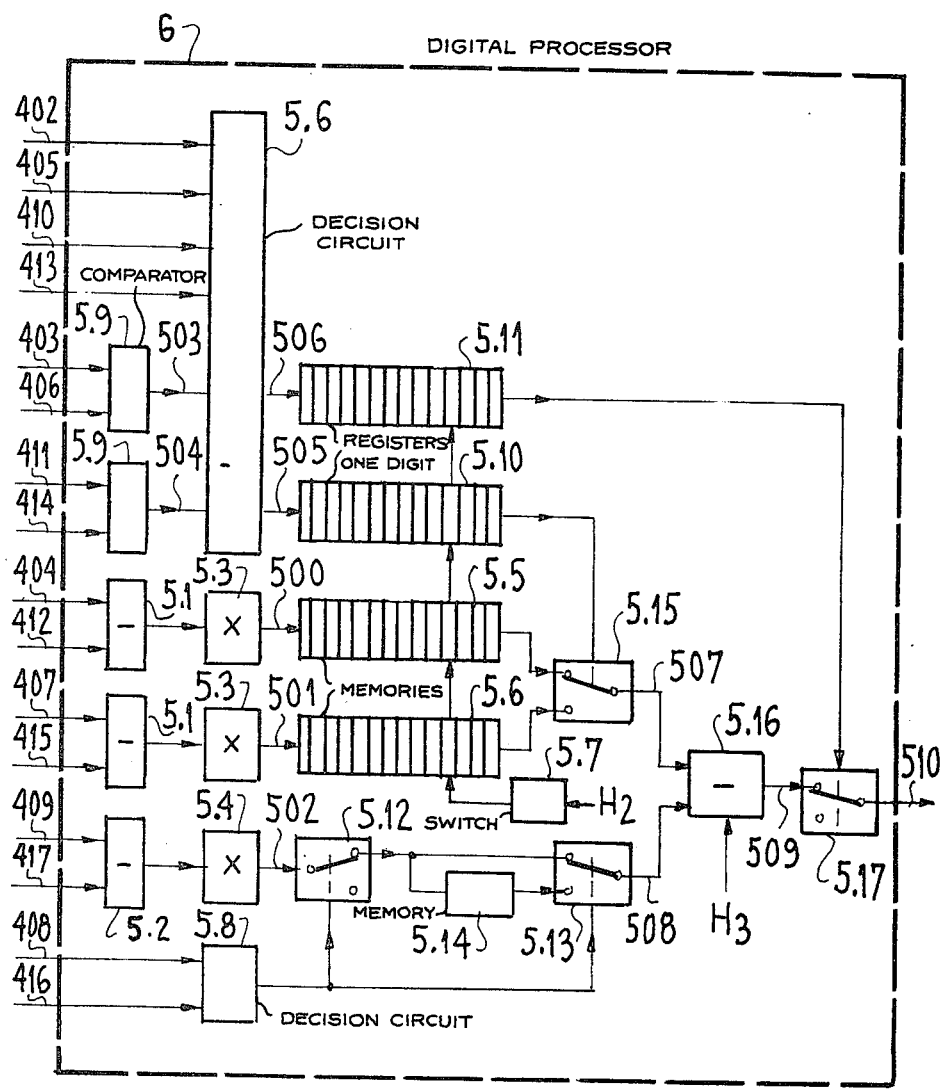

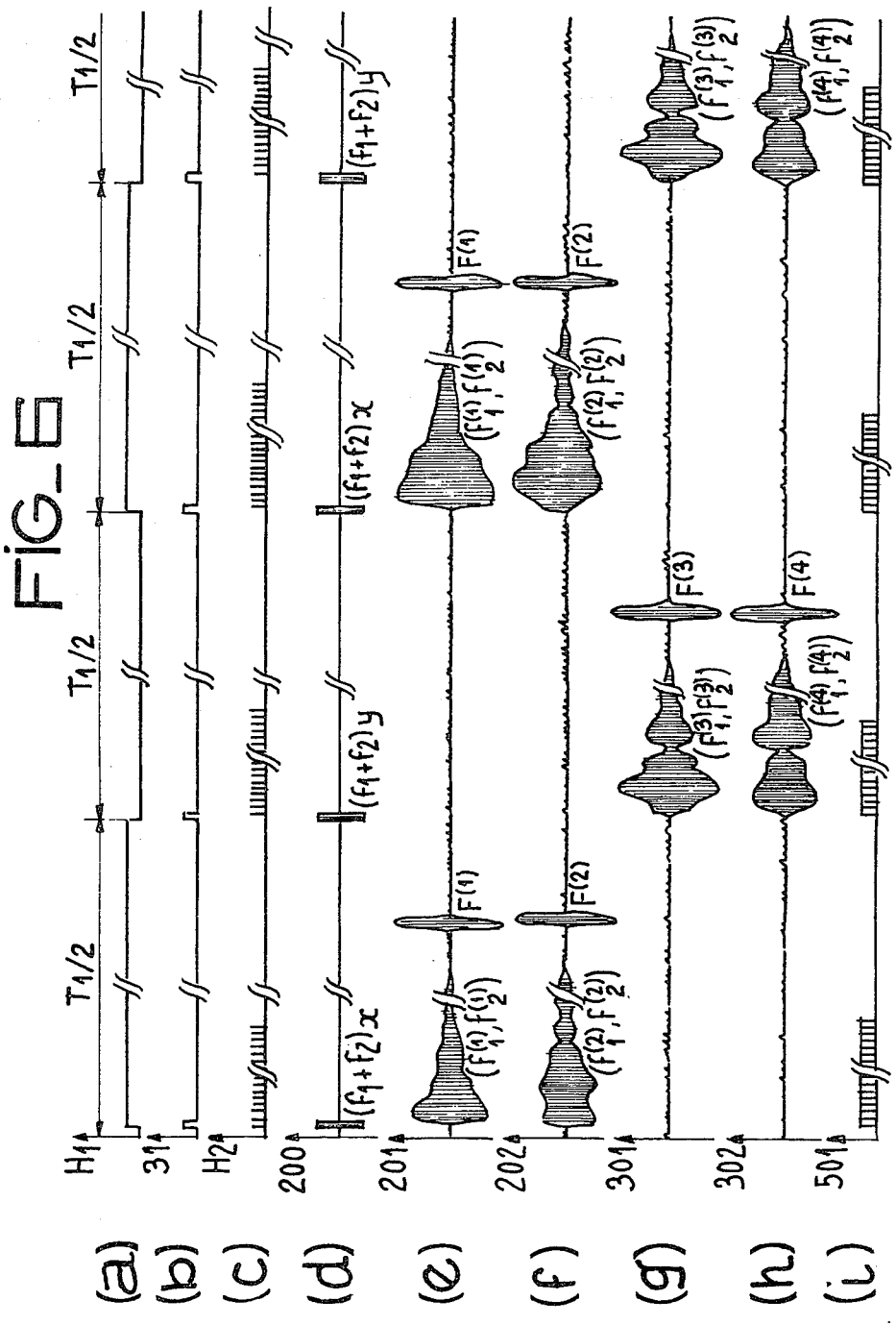

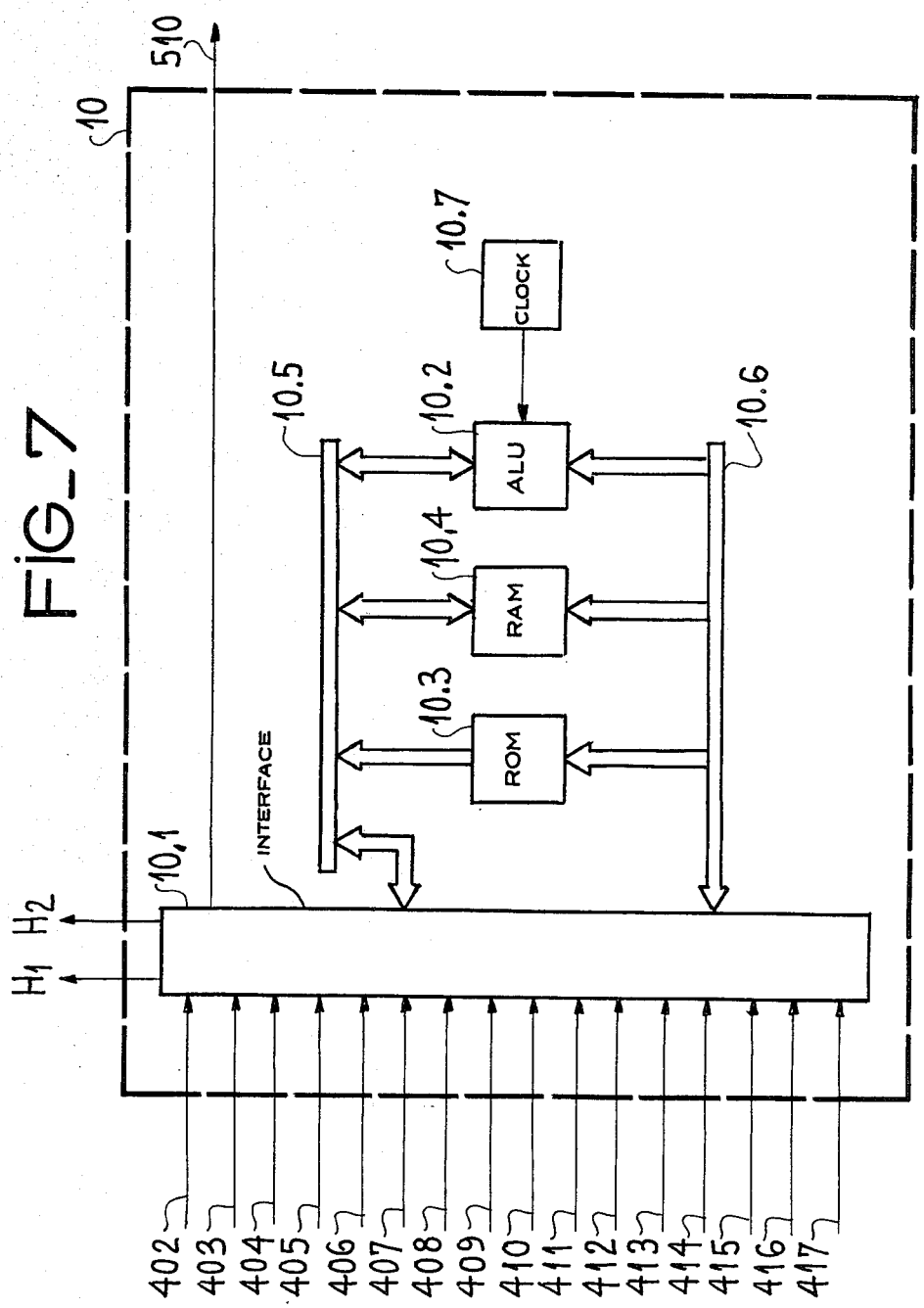

DOPPLER CURRENT METER FOR USE AT GREAT DEPTHS

BACKGROUND OF THE INVENTION

This invention relates to current meters, which are devices for measuring currents in an aquatic medium, more particularly for measuring the velocity of marine currents, by the Doppler effect.

The measurements are made in a moving boat and the speeds of the currents are determined practically from the surface to great depths which may exceed 1000 m.

Knowledge of the profile of currents as a function of depth is important for navigational estimates, for navigating submarines, in petroleum and mining exploration on the high seas and in geophysical studies and the study of the environment.

One type of current meter, known as a conventional type, such as those comprising a screw or the electromagnetic type, having to be placed in the medium in order to measure the current, and unless the number of pickups is multiplied they can only make point measurements. It is known that, in order to obtain a quasi-instantaneous measurement of the profile of currents, it is necessary to use another type of current meter, i.e. Doppler effect current meters. For this, sonars are used the transmission axes of which are inclined relative to the vertical. The echos obtained are due, on the one hand, to the volume reverberation and, on the other hand, to the reflection by the sea bed.

The volume reverberation echos undergo a variation in frequency because of the Doppler effect, depending on the relative velocity of the boat in relation to the current at the point measured. The depth corresponding to the measuring point is deduced from the return time.

The absolute velocity of the boat is calculated from the variation in frequency by the Doppler effect of the echo produced by the sea bed.

The measurements are taken in two perpendicular vertical planes, thus enabling the boat/current velocity and boat/sea bed velocity vectors to be established.

The current/sea bed speed vector is deduced by subtaction from the preceding vectors. If this operation is carried out for all the volume reverberation echos at the different depths, the profile of the current velocity vectors is obtained.

To obtain sufficient power for the reverberation echos, experience has shown that high frequencies ($\simeq 50$ kHz) must be used; on the other hand in order to obtain echos on sea beds of the order of 3,000 m deep, taking the propagation losses into account, low frequencies ($\simeq 10$ kHz) have to be used.

It is known to transmit and receive simultanously at one low frequency and at one high frequency. The low frequency being used for the sea bed echo and the high frequency for the reverberation echos.

However, the transmission of a low frequency makes it necessary to use transducers with dimensions of the order of one meter for an angle of opening of the radiation diagram of 7°, which would result in a prohibitively large bulk.

It is known too to detect targets in the sea bed, with a sonar transmitting two high frequencies and receiving echos of a low frequency, differences of the two high frequencies, generated by the non-linear effects of sea water.

BRIEF SUMMARY OF THE INVENTION

The device according to the invention remedies these disadvantages and enables the velocity profile to be measured even for depths of 3000 m using transmitters/receivers of reduced size, thanks to the use of simultaneous emission at two high frequencies. Reception then occurs at high frequencies for the volume reverberation echos and at low frequencies for the sea bed echos. The low frequency is the difference between the two high frequencies.

This emission at the frequency known as the difference frequency is due to the nonlinear effects of the water and has a good directivity. It is known that the antenna which is equivalent to the difference frequency is the zone of interaction of the two waves transmitted at high frequency, which is much larger than the transmission antenna.

Thanks to the device according to the invention, the velocities of currents can be measured even at great depths.

More precisely, the invention relates to the device for measuring aquatic currents, known as a current meter, placed on a moving boat comprising a Doppler effect sonar, transmitting and receiving in the directions $D_1$, $D_2$, $D_3$ and $D_4$, $D_1$ and $D_2$ being located in a plane $O \times z$ and forming an angle $+\alpha$ and $-\alpha$ with the vertical $Oz$, whilst $D_3$ and $D_4$ are located in the plane $Oyz$ perpendicular to $O \times z$ and $D_3$ and $D_4$ form an angle $+\alpha$ and $-\alpha$ with $Oz$ and receive signals coming from the volume reverberation in the aquatic medium and the reflection from the sea bed, this device also comprising means for processing the signals received in order to calculate the horizontal components of the velocities of the currents in relation to the boat and the horizontal components of the speed of the boat, and means for calculating the horizontal components of the speed of the currents at different depths, wherein the device comprises means for simultaneously transmitting at two frequencies $f_1$ and $f_2$ and means for receiving the signals affected by the Doppler effect at the frequencies $f_1^{(1)}$, $f_1^{(2)}$, $f_1^{(3)}$, $f_1^{(4)}$, $f_2^{(1)}$, $f_2^{(2)}$, $f_2^{(3)}$ and $f_2^{(4)}$ corresponding, respectively, to the emissions at the frequencies $f_1$ and $f_2$ in the directions $D_1$, $D_2$, $D_3$ and $D_4$; and means for receiving the signals at the frequencies $F^{(1)}$, $F^{(2)}$, $F^{(3)}$ and $F^{(4)}$ coming from the sea bed corresponding to waves at a frequency $F = f_1 - f_2$ generated by the nonlinearities of the medium for the directions $D_1$, $D_2$, $D_3$ and $D_4$, the signal processing device providing values for the components of the boat/current velocity along $Ox$ from the values $f_1^{(1)} - f_1^{(2)}$ and/or $f_2^{(3)} - f_2^{(4)}$ and the components along $Oy$ from the values of $f_1^{(3)} - f_1^{(2)}$ and/or $f_2^{(3)} - f_2^{(4)}$, the components of the absolute velocity along $Ox$ and $Oy$ being calculated from the values $F^{(1)} - F^{(2)}$ and $F^{(3)} - F^{(4)}$; and these values of the velocity components are used to calculate the velocity of the currents.

BRIEF DESCRIPTION OF THE DRAWINGS

Further features and advantages will become apparent from the description, illustrated by the drawings, wherein:

FIG. 1 is a diagram of the principle of the Doppler current meter,

FIG. 2 is a general plan of the device according to the invention,

FIG. 3 is a general diagram of the transmission circuits,

FIG. 4 is a diagram of the analogue processing circuits for the reception signals, FIG. 5 is a diagram of the digital processing circuits for the reception signals, FIG. 6 shows some time signals, FIG. 7 shows an alternative embodiment of the digital processing circuits for the reception signals.

DETAILED DESCRIPTION OF THE PREFERRED EMBODIMENTS

When an acoustic wave is transmitted in water, the non linear properties of the medium mean that the speed of this wave depends on the instantaneous amplitude of the sound pressure, the sinusoidal form of this pressure becomes deformed and tends towards a saw-tooth shape.

Consequently, if two sound waves at frequencies $f_1$ and $f_2$, known as primary frequencies, are transmitted in the same volume, they interact to give all the products of intermodulation, including, in particular, the signal at the frequency $f_2+f_1$, which is rapidly absorbed, and the desired signal at the frequency $f_2-f_1=F$.

The antenna radiating this low frequency is therefore not the antenna or transducer fixed underneath the boat, but the entire volume which is "insonified" by the two primary frequencies. This elongated antenna, consisting of water, radiates its low frequency in the direction of the propagation of the primary waves.

This elongate antenna has characteristic properties such as a directivity of $$\sqrt{\frac{\lambda}{L}}$$

and small secondary lobes ($\lambda$=wavelength in water vibrating at a frequency F, L=length of this antenna consisting of water). Thus, it is possible to generate very fine radiation diagrams, much finer than would have been possible with the small surface areas of transmission generating the primary radiation diagrams.

It is known to use sonars using nonlinear acoustics by transmitting at two frequencies simultaneously and receiving the "difference" or secondary frequency. The sonars generally known as parametric sonars are used in particular to sound the sea bed. It is common to use primary frequencies of around 38 kHz and a secondary frequency of from 0.8 to 6.7 kHz for this purpose. The low frequencies penetrate the marine subsoil easily.

According to the invention, these nonlinear effects are used to deterine the speeds of currents by the Doppler effect.

In order to obtain acceptable sound levels at the difference frequency F, high sound levels have to be transmitted at the primary frequencies. The high level of power is not a disadvantage, in view of the fact that it is necessary in order to recover a sufficient signal level in the volume reverberation echos.

It should be noted that this adequate level is virtually only obtained for frequencies higher than 20 kHz, corresponding to diffusion by biological components such as plankton.

FIG. 1 diagrammatically shows the device according to the invention. A surface boat 100 travels in a direction x at an absolute velocity $\vec{W}$. A sonar 110 simultaneously transmits impulses at frequencies $f_1$ and $f_2$ at a repeat interval $T_1$, in the two median directions $D_1$ and $D_2$. $D_1$ and $D_2$ are in the plane xz, z being the vertical direction, and form angles of $+\alpha$ and $-\alpha$, respectively, with the direction z. The sonar 110 also emits impulses at the frequencies $f_1$ and $f_2$ which are offset relative to the first impulses by $T_1/2$, in the two median directions $D_3$ and $D_4$. $D_3$ and $D_4$ are in the plane yz and form angles of $+\alpha$ and $-\alpha$, respectively, with the direction z.

FIG. 2 is a diagram of an exemplary embodiment of the invention.

The device comprises a transmitter unit 1 and two sets of transducers 2 and 3. Each of these sets comprises 4 transducers which, two by two, form a dihedron. Their arrangement underneath the boat is such that the transducers radiate in directions which form the angle $+\alpha$ with the vertical Oz oriented downwards. A value of 30° is generally taken for this angle $\alpha$. The transducers 2.1 and 2.3 of set 2 radiate, respectively, in directions parallel to $D_1$ and $D_2$, which form angles $+\alpha$ and $-\alpha$ with the vertical Oz oriented downwards, the plane of which is O×z.

The transducers 2.2 and 2.4 of set 2 receive the signals coming from the directions $D_1$ and $D_2$, respectively. Similarly, the set 3 comprises the transmission transducer 3.1 and receiving transducer 3.2, the axes of which are parallel to $D_3$, and the transmission transducer 3.3 and receiving transducer 3.4, the axes of which are parallel to $D_4$. $D_3$ and $D_4$ are in the plane Oyz.

The receiving unit 4 comprises analogue and digital processing circuits 5 and 6, respectively. This digital processing may be effected either by the conventional method using integrated circuits or by the use of microprocessors.

The values of the velocities measured in the different strata are displayed and recorded by the unit 7, which comprises two subassemblies 7.2 and 7.3 corresponding, respectively, to the values obtained along x and y. The receiving network 4 is common to the processing operations along x and y. The timing signals $H_1$ with a periodicity $T_1$ control the switches 8.1, 8.2 and 8.3 at time intervals $T_1/2$ in order to switch over to set 2 or 3. Another switch 7.4 is controlled at the same period in order to pass the signals to sets 7.2 and 7.3 alternately.

Taking $T_1/2=4$ sec., it is possible to reach sea beds 3000 m deep.

Corresponding to the waves transmitted at the frequency $f_1$ there are reverberation echos in the medium at frequencies offset by the Doppler effect $f_1^{(1)}$, $f_1^{(2)}$, $f_1^{(3)}$ and $f_1^{(4)}$, respectively, corresponding to the directions $D_1$, $D_2$, $D_3$ and $D_4$.

Echos are also received at the frequencies $f_2^{(1)}$, $f_2^{(2)}$, $f_2^{(3)}$ and $f_2^{(4)}$ corresponding to the directions $D_1$, $D_2$, $D_3$ and $D_4$.

Owing to the nonlinearity of the marine medium, there is also a transmission at the "difference" frequency $F=f_1-f_2$ and, on reception, echos off the sea bed are obtained at the frequencies $F^{(1)}$, $F^{(2)}$, $F^{(3)}$ and $F^{(4)}$ corresponding to the directions $D_1$, $D_2$, $D_3$ and $D_4$.

If $\vec{U}$ is the relative velocity vector of the boat in relation to the current, $\vec{W}$ the absolute velocity vector of the boat and $\vec{V}$ the absolute velocity vector of the current, we have:

$$\vec{V} = \vec{W} - \vec{U} \qquad (1)$$

If $V_x$, $W_x$ and $U_x$ are the components over x of the vectors $\vec{V}$, $\vec{W}$ and $\vec{U}$; if $V_y$, $W_y$ and $U_y$ are the components of these vectors over y, by the known equations of the Doppler sonar where C is the speed in the medium, we have:

$$U_x = \frac{C}{4f_1\sin\alpha}(f_1^{(1)} - f_1^{(2)}) = \frac{C}{4f_2\sin\alpha}(f_2^{(1)} - f_2^{(2)}) \quad (2)$$
$$U_y = \frac{C}{4f_1\sin\alpha}(f_1^{(3)} - f_1^{(4)}) = \frac{C}{4f_2\sin\alpha}(f_2^{(3)} - f_2^{(4)})$$

Similarly, the absolute velocity of the boat can be found using the Doppler variations in the difference frequency F obtained by the non-linearity of the medium.

$$W_x = \frac{C}{4F\sin\alpha}(F^{(1)} - F^{(2)}) \quad (3)$$
$$W_y = \frac{C}{4F\sin\alpha}(F^{(3)} - F^{(4)})$$

We have seen that in general the boat moves along Ox and therefore $W_y=0$.

According to one of the features of the invention, the measurements are taken both for the signals corresponding to the frequency $f_1$ and to the frequency $f_2$ and equation (2) shows that two values of $U_x$ and $U_y$ can thus be obtained, making it possible to select the best measurement using a first decision circuit.

Therefore, from the equations (1), (2) and (3), the value of the components of the absolute velocity of the current can be determined.

Details of the transmission circuit 1 in FIG. 2 are shown in FIG. 3. Two oscillators 1.1 and 1.2 operate at respective frequencies of $f_1$ and $f_2$ and their signals are added by the adder 1.3 and cut out by an "all or nothing" modulator 1.4 which is itself acted upon by a signal of duration τ prepared by the circuit 1.5 from the synchronisation signal $H_1$. The signal issuing from the modulator 1.4 is amplified by the amplifier 1.6 and sent to the transmission transducers simultaneously in both directions in one plane, for example towards $D_1$ and $D_2$ to start with. At the following half timing cycle $H_1$, the same process is repeated with emission and reception along $D_3$ and $D_4$ in the plane yz.

During the first cycle of $H_1$, the signals of the reverberations on the strata of water are received, coming from directions $D_1$ and $D_2$ in the plane xz.

Owing to the Doppler effect, the signals received are at the frequencies $f_1^{(1)}$ and $f_2^{(1)}$ for the direction $D_1$ and at the frequencies $f_1^{(2)}$ and $f_2^{(2)}$ for the direction $D_2$.

The transducer 2.2 in FIG. 2 supplies, at 400, at the input of the processing means 4 in FIG. 4, signals at the frequencies $f_1^{(1)}$, $f_2^{(1)}$, $F^{(1)}$. The signals of frequencies $f_1^{(1)}$, $f_2^{(1)}$ obtained by reverberation of the strata of water with the Doppler shift are amplified by the amplifier 4.1 and applied to the filters 4.4 and 4.5. The filter 4.4 is centred on $f_1$ and the filter 4.5 on $f_2$.

The filters 4.4 and 4.5 have a bandwidth for passing on signals at the frequencies shifted by the Doppler effect for boat/current or boat/sea bed velocities of from −10 to +20 knots. The corresponding amplifiers must therefore have these bandwidths. The frequencies of the signals supplied by the reverberation are measured every 30 msec., which, taking the inclination of the beams into account, corresponds to measurements of strata of water approximately 20 m thick.

Temporal use of the signals received is obtained by means of the timing signals $H_2$ with a periodicity of 30 msec which control the numerical frequency counters 4.7 which receive the signals at the Doppler frequencies $f_1^{(1)}$ and $f_2^{(1)}$.

The signals reflected by the sea bed at the Doppler frequency $F^{(1)}$ are also applied to a numerical frequency counter 4.8. The time of arrival of the signal at the frequency $F^{(1)}$ is not known beforehand and the counter 4.8 has to be triggered by the signal itself, which undergoes a short detection-integration of the order of 1 period of secondary frequency in the circuit 4.9 which controls the triggers 4.10.

Moreover, the signals filtered by the filters 4.4 and 4.5 are applied to detection and short integration circuits 4.11, this integration being carried out over a period of time of the order of 1 period of primary frequency. The integrated signals control the triggers 4.12 which supply the binary signals of validity of the measurement.

The signals filtered by the filters 4.4 and 4.5 are also applied to detection and long integration circuits over some tens of periods of the primary frequency 4.13 followed by digital-analogue converters 4.14.

The signals at frequency $F^{(1)}$ obtained from the reflection on the sea bed of the waves generated by the nonlinearity of the medium are filtered by the filter 4.6 centred on the frequency F, after amplification by means of the variable gain amplifier 4.2. This variable gain in time (T.V.G.) is controlled by a function generator 4.3 which is itself controlled at each half timing cycle $H_1$. This T.V.G. is necessary in order to regularise the great differences in amplitude which may exist in the signal $F^{(1)}$ sent back by the sea bed, owing to the greatly variable depth of the sea.

In parallel manner, the amplitude of the signals is measured in order to decide, provided that no bad signals have been detected, which signal has the greatest amplitude.

Passages below a fixed threshold are determined by the triggers 4.12 in FIG. 4 which supply binary signals at 402, 405, 410 and 413.

These signals provide validation of the signals at the frequencies $f_1^{(1)}$, $f_2^{(1)}$, $f_1^{(2)}$ and $f_2^{(2)}$. They are applied to a first decision circuit 5.6 (FIG. 5) in the unit 6. Similarly, the signals supplied by the triggers 4.10 are used at 408 and 416 for the input to a second decision circuit 5.8 (FIG. 5) in order to validate the absolute measurement of the speed of the boat.

The amplitude of the Doppler signals corresponding to the frequencies $f_1$ and $f_2$ is measured by long detection-integration (some tens of periods) at 4.13 followed by a digital-analogue converter 4.14 (FIG. 4). Thus, at 403, 406, 411, 414, there are digital signals representing the respective amplitudes of the signals of frequencies $f_1^{(1)}$, $f_2^{(1)}$, $f_1^{(2)}$ and $f_2^{(2)}$, which are compared two by two, signal $f_1^{(1)}$ with signal $f_2^{(1)}$ and signal $f_1^{(2)}$ with signal $f_2^{(2)}$, in the comparators such as 5.9 the outputs 503 and 504 of which are also sent to the decision circuit 5.6 (FIG. 5).

Similarly, the signals picked up by the transducers 2.4 or 3.4 (FIG. 2) are applied at 401 to the circuit 5 (FIG. 4) with analogous processing to that of the signals of the transducers 2.2 and 3.2.

Finally, at the outputs of the device 5, there are digital signals representing the Doppler frequencies $f_1^{(1)}$, $f_2^{(1)}$, $F^{(1)}$, $f_1^{(2)}$, $f_2^{(2)}$ and $F^{(2)}$, respectively, or 404, 407, 409, 412, 415 and 417.

These signals are then processed in the unit 6. In order to supply the signals corresponding to equations (1), (2) and (3), the values of $f_1^{(1)}$ and $f_2^{(1)}$, $f_1^{(2)}$ and $f_2^{(2)}$, $F^{(1)}$ and $F^{(2)}$ are subtracted in numerical subtractors such as 5.1 and 5.2 the signals of which are multiplied by the respective coefficients $$\frac{C}{4\sin\alpha}\cdot\frac{1}{f_1},\frac{C}{4\sin\alpha}\cdot\frac{1}{f_2},\frac{C}{4\sin\alpha}\cdot\frac{1}{F}$$

in numerical multipliers such as 5.3 and 5.4. The circuits such as 5.1 and 5.3 are synchronous with the counters 4.7 by means of the timer $H_2$ in order to supply batches of measurements every 30 msecs.

The signals supplied by the decision circuit 5.6 are of two types: at 505, signals validating $U_{x,y}(f_1)$ or $U_{x,y}(f_2)$ which are put into the memory store of the register with 1 digit 5.10, and at 506, signals validating $U_{x,y}(f_1)$ and $U_{x,y}(f_2)$ which are put into the memory store of the register with 1 digit 5.11. The addresses of these registers are incremented by the circuit 5.7.

A notation such as $U_{x,y}(f_1)$ is used for the component of $\vec{U}$ along x for a half-period of $H_1$ and for the component of U along y for the other half-period of $H_1$, obtained from the signals at the frequency $f_1$.

At the output 502 from the multiplication circuit 5.4, the numerical value of the component of the absolute velocity $\vec{W}$ on the x or y axis is obtained during a half timing period $H_1$.

At the outputs from the multiplication circuits 5.3, the numerical values of the components of the relative velocities of boat a currents, measured by the frequencies $f_1$ and $f_2$, are obtained at 500 and 501. These values are respectively put in the multiple digit memory 5.5 for the value obtained from $f_1$ and in the multiple digit memory 5.6 for the value obtained from $f_2$.

From the timing signals $H_2$, the circuit 5.7 increments the addresses of the memories 5.5, 5.6, 5.10 and 5.11. Thus, 64 different measurements and their validations are put in at each half-cycle of timing $H_1$, corresponding to 64 successive 20 meter strata of water.

According to the invention, as a result of the largest variation in the signals on the strata of water, the best of the two measurements obtained is selected, one being $U_{x,y}(f_1)$ over $f_1$, the other being $U_{x,y}(f_2)$ over $f_2$. To do this, the Doppler signals received are analysed, not only in order to find the better measurement, but also decide whether either of them is good.

To achieve this, one starts by detecting any possible reductions in the amplitude of the signals which would bring them below a given threshold below which the counters would give erroneous values.

The signals obtained from the second decision circuit 5.8 control the switches 5.12 and 5.13. The values of the component of the absolute velocity $W_{x,y}$ given by the circuit 5.4 at 502 are not transmitted if the level of the echo is inadequate. If this level is adequate, the signal 502 is transmitted both to the memory 5.14 and passes through the switch 5.13 at 508. On the other hand, if the level is inadequate, a previous value $W_{x,y}$ stored in the memory 5.14 is transmitted to 508.

The binary signals obtained from the memory 5.10 control the choice between $f_1$ and $f_2$ by the switch 5.15, which receives at these inputs the values supplied by the memories 5.5 and 5.6. At the outputs from the switches 5.15 at 507, the value of the better component of the boat-current velocity is obtained after a choice between $U_{x,y}(f_1)$ and $U_{x,y}(f_2)$.

A subtraction circuit 5.16 receives at its inputs 507 and 508 the values of $W_{x,y}$ and $U_{x,y}$. At its output at 509, the value of the component of the absolute velocity of the current $V_{x,y}$ is obtained according to equation 1. This subtraction is carried out at a timing rate $H_3$.

However, the validation data contained in the memory 5.11 and re-read synchronously like that obtained from the memory 5.10 and 5.5 or 5.6 serves to invalidate, by means of the switch 5.17, the measurements of $V_{x,y}$ marred by errors both on $f_1$ and $f_2$. Thus, at 5.10, there is a batch of numerical measurements representative of $\vec{V}$ on an axis of the boat during a half timing cycle $H_1$. During a subsequent half cycle, i.e. about 4 seconds later, another batch of measurements representing $\vec{V}$ on an axis perpendicular to the previous one is obtained, as has been seen.

FIG. 7 shows some time signals present at several characteristic points of the device. The signal of line a represents the timing signal $H_1$ giving the period of the alternate transmission-reception in the planes xz and yz.

The signal of line b shows the transmission window present at 31 in FIG. 3. Its duration is a few milliseconds. The signal of line c represents the signal of the timer $H_2$ intended to divide the time up into a certain number of 30 millisecond segments as soon as emission ceases. However, it should be understood that these signals can be transmitted at any moment which is compatible with the reception cycle, in order to carry out measurements on a succession of strata of water which do not start in the vicinity of the transducers.

The signal of line d corresponds to the output voltage of the transmission circuit 1 (FIG. 3) at 200, namely the sum of the signals at frequencies $f_1$ and $f_2$, emitted once in the plane xz and again in the plane yz, represented by the symbols on the figure $(f_1+f_2)_x$ and $(f_1+f_2)_y$.

On line e are shown the reception signals of the transducer 2.2 at 201 in FIG. 2 during a half-cycle of $H_1$ and on line f are shown the reception signals of the transducer 3.2 at 301 during the other half cycle of $H_1$. Similarly, the lines g and h represent the signals received by the transducers 2.4 and 3.4 at 202 and/or 302. At the start, the 4 signals comprise the reverberation signals with the Doppler effect at the primary frequencies $f_1$ and $f_2$, followed by the signal of the sea bed echo with the Doppler effect at the difference frequency F. Only these 4 signals shown in FIG. 6 are processed by the circuits 4 and 5 in FIGS. 5 and 6.

On line i are shown the bundles of binary signals leaving the circuit 6 at 510. Each of them is made up of binary elements of the absolute velocity of the corresponding stratum of water obtained according to the invention, according to the better of the two measurements, one of which is made from the frequency $f_1$ whilst the other is made from frequency $f_2$. One of these measurements can very easily be cancelled owing to a lack of amplitude on one or more of the components of the calculation. The signals are shown as being synchronous with the timing signals $H_1$ to make the drawings simpler. Obviously, as they have been put into the memory store, they can be reconstituted at any time in a half timing cycle at a rate which may differ from the rate $H_2$.

In an alternative embodiment of the invention all the numerical processing effected by the circuit 6 in FIG. 5 may be replaced by the synoptic 10 in FIG. 7 comprising an input-output interface circuit 10.1, a central unit (UAL) 10.2 which communicates with the interface 10.1, the read only memory (ROM) 10.3, the random access memory (RAM) 10.4 via the bidirectional bus of data 105, the selection being made by the bus of addresses 10.6. The rate of exchanges is regulated by the clock 10.7. It will be appreciated that the signals $H_1$ for switching the axes and the T.V.G. signals and the $H_2$ signals for dividing the time into segments of 30 ms are now provided by this assembly, whilst the clock circuit 9 in FIG. 2 is eliminated.

The programme of the exchange of data, the measurement and comparison thereof and the preparation of timing signals $H_1$ and $H_2$ is stored in the ROM 10.3 and the data and provisional results are stored in the RAM 10.4.

According to an alternative embodiment of the invention, by modifying the reception circuits, the vertical component of the velocity of marine currents $V_z$ can be determined.

In effect, we have:

$$V_z = C/(4 f \cos \alpha)(f^{(1)} + f^{(2)})$$

where f is one of the frequencies $f_1$ and $f_2$.

Therefore, to obtain $V_z$, the circuits 5.1 and 5.2 (FIG. 6) can be modified, replacing the subtractors with adders and, in the multiplication, changing $C/(4 f \sin \alpha)$ to $C/(4 f \cos \alpha)$.

This operation will therefore give the relative vertical velocity of boat/currents. This calculation can be continued to obtain, as before, the absolute vertical velocity boat/currents by subtracting the vertical velocity of boat/sea bed obtained by an identical procedure. However, it should be noted that if the relative vertical measurements relating to the different strata are all disrupted by the vertical velocity of the boat as a result of the swell, an individual correction has to be made, not by correcting the acoustic information of the absolute vertical velocity of the boat relative to the sea bed, the information rate of which is too low, but by using another means of measurement, such as an accelerometer.

The purely acoustical method is, on the other hand, valid for a submerged current meter, either being carried at a depth of submersion where it is not affected by the swell, or fixed relative to the sea bed.

A preferred embodiment has the following features:
$f_1 = 45$ kHz
$f_2 = 55$ kHz
with $F = 10$ kHz
dimensions of the electroacoustical transducers: $100 \times 200$ mm (identical transmission and reception) giving, at an average frequency of 50 kHz, angles of opening of 7.5°, according to the dimension of 200 mm arranged along the measuring axis
directivity index $= 25.5$ dB
maximum sound level at $f_1$ or $f_2 = 126.5$ dB with an electrical power of 2 KW
sound level at the frequency $F = 95$ dB
minimum signal perceptible by a force 4 sea, with a signal-to-noise ratio of 12 dB and a band width 30 Hz $= -54$ dB at frequency $f_1$ or $f_2$
range on sea bed $= 3000$ m
range of reverberation $= 1000$ m in water with a reverberation index $= -80$ dB
number of strata of water measured $= 64$
thickness of strata $= 20$ meters To conclude, a Doppler sonar is described, using the non-linear effects of the medium in order to measure the velocity of a boat relative to the sea bed, in order to determine the profile of marine currents; this measurement can be made for depths of up to 3000 m.

The invention is not limited to the embodiments described and represented hereinbefore and various modifications can be made thereto without passing beyond the scope of the invention.

I claim:

1. A device for measuring aquatic currents, known as a current meter, placed on a moving boat, comprising a Doppler effect sonar, transmitting and receiving in the directions $D_1$, $D_2$, $D_3$ and $D_4$, $D_1$ and $D_2$ being located in a plane $O \times z$ and forming an angle $+\alpha$ and $-\alpha$ with the vertical Oz, $D_3$ and $D_4$ being located in the plane Oyz perpendicular to $O \times z$ and $D_3$ and $D_4$ forming an angle of $+\alpha$ and $-\alpha$ with Oz and receiving signals coming from the volume reverberation in the aquatic medium and from the reflection off the sea bed, the device also comprising means for processing the signals received in order to calculate the horizontal components of the velocities of the currents relative to the boat and the horizontal components of the velocity of the boat, and means for calculating the horizontal components of the velocity of the currents at different depths, wherein the device comprises means for transmitting simultaneously at two frequencies $f_1$ and $f_2$ and means for receiving the volume reverberation signals affected by the Doppler effect at the frequencies $f_1^{(1)}$, $f_1^{(2)}$, $f_1^{(3)}$, $f_1^{(4)}$, $f_2^{(1)}$, $f_2^{(2)}$, $f_2^{(3)}$ and $f_2^{(4)}$ corresponding, respectively, to the emissions at the frequencies $f_1$ and $f_2$ in the directions $D_1$, $D_2$, $D_3$ and $D_4$, and means for receiving the signals at the frequencies $F^{(1)}$, $F^{(2)}$, $F^{(3)}$ and $F^{(4)}$ coming from the sea bed corresponding to waves at the frequency $F = f_1 - f_2$ generated by the nonlinearity of the medium for the directions $D_1$, $D_2$, $D_3$, $D_4$, the signal processing device providing the values of the components of the boat/current velocity along Ox from the values $f_1^{(1)} - f_1^{(2)}$ and/or $f_2^{(1)} - f_2^{(2)}$ and the components along Oy from the values of $f_1^{(3)} - f_1^{(4)}$ and/or $f_2^{(3)} - f_2^{(4)}$, the components of the absolute velocity of the boat along Ox and Oy being calculated from the values $F^{(1)} - F^{(2)}$ and $F^{(3)} - F^{(4)}$, and wherein all these values of the velocity components are used to calculate the velocity of the currents.

2. A current meter according to claim 1, wherein the device comprises a first decision circuit enabling the amplitude of the signals received corresponding to the transmitted frequencies $f_1$ and $f_2$ to be compared, this decision circuit controlling a switch for the transmission of the highest signal.

3. A current meter according to claim 1, wherein the processing means comprise circuits controlled by a timer with a periodicity of $T_2$ for the temporal use of the reception signals and for determining the horizontal velocity of the currents in different depth sectors.

4. A current meter according to claim 1, wherein a timer with a periodicity of $T_1$ controls switches at every period of $T_1/2$, for switching over the transmission, reception and processing corresponding to the planes Oxz and Oyz.

5. A current meter according to claim 2, wherein the volume reverberation signals are amplified and filtered and applied, on the one hand, to binary counters and, on the other hand, to detectors followed by a trigger providing the signals applied to the first decision circuit.

6. A current meter according to claim 1, wherein the processing means comprises an amplifier with a variable gain in time, which amplifies the signals at the difference frequency F, the amplified signals being applied to filters, detectors and integrators, the integrated signal triggering, on the one hand, a binary counter for the amplified and filtered signals and, on the other hand, being applied to a second decision circuit which controls a switch which switches over the signal corresponding to the value of the velocity of the boat calculated or that of the calculation of the value previously put into a memory.

7. A current meter according to claim 2, wherein the values of the components of the velocity of the boat relative to the currents and the signals supplied by the first decision circuit corresponding to intervals of time $T_2$ are applied to multiple memories which can thus be re-read at a slower rate.

* * * * *